(12) United States Patent
Uno et al.

(10) Patent No.: US 7,515,521 B2
(45) Date of Patent: Apr. 7, 2009

(54) HOLOGRAM RECORDING AND REPRODUCING APPARATUS

(75) Inventors: Kazushi Uno, Kawasaki (JP); Kouichi Tezuka, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 11/355,854

(22) Filed: Feb. 15, 2006

(65) Prior Publication Data

US 2006/0215529 A1    Sep. 28, 2006

(30) Foreign Application Priority Data

Mar. 24, 2005    (JP) ............................. 2005-085449

(51) Int. Cl.
*G11B 7/00* (2006.01)

(52) U.S. Cl. .................................... 369/103; 369/44.32

(58) Field of Classification Search ........................ None
See application file for complete search history.

(56) References Cited

U.S. PATENT DOCUMENTS 7,116,626 B1 * 10/2006 Woods et al. ............... 369/103

FOREIGN PATENT DOCUMENTS

JP    9-305978    11/1997

* cited by examiner

*Primary Examiner*—Paul Huber
(74) *Attorney, Agent, or Firm*—Greer, Burns & Crain, Ltd.

(57) ABSTRACT

A hologram recording and reproducing apparatus minimizes reproduction errors by servo control on the tilting of a reference beam relative to a hologram recording medium. The apparatus includes an optical detector for servo control and an optical sensor for reproduction signal conversion. A pixel pattern generator generates, on a wave surface of the recording beam, a discretely distributed recording pixel pattern corresponding to the information to be recorded, and a specifically shaped and localized servo pixel pattern for the servo control. A beam splitter splits the reflected beam from the hologram recording medium into a reproduction beam directed to the optical detector for reproduction signal conversion and a servo beam directed to the optical detector for servo control. A servo controller controls the tilting of the reference beam relative to the hologram recording medium, based on an output signal from the servo control optical detector.

8 Claims, 8 Drawing Sheets

FES=(Sa+Sc)−(Sb+Sd)
TES=(Sa+Sd)−(Sb+Sc)
CLOCK=(Sa+Sb)−(Sc+Sd)

FES=(Sa+Sc)−(Sb+Sd)
TES=(Sa+Sd)−(Sb+Sc)
CLOCK=(Sa+Sb)−(Sc+Sd)

HOLOGRAM RECORDING AND REPRODUCING APPARATUS

BACKGROUND OF THE INVENTION

1. Field of the Invention

The present invention relates to a hologram recording and reproducing apparatus for recording a hologram in a hologram recording medium and reproducing the information recorded in the hologram.

2. Description of the Related Art

A conventional hologram recording and reproducing apparatus is disclosed in JP-A-H09-305978, for example. The hologram recording and reproducing apparatus splits a laser beam emitted by a laser source into a recording beam and a reference beam, and irradiates a rotating disk, which serves as the hologram recording medium, with the recording beam and the reference beam superposed on each other. The recording beam includes a discretely distributed pixel pattern formed on the wave surface through optical modulation based on the recorded information, and such recording beam interferes with the reference beam so that the hologram is recorded on the rotating disk. When reproducing the recorded information based on the hologram, the reference beam is emitted onto the rotating disk, so that an optical detector for conversion of a reproduction signal detects a reflected beam from the rotating disk. The optical detector detects the reflected beam containing the same pixel pattern as that of the recording beam, to thereby reproduce the recorded information.

The rotating disk, which serves as the hologram recording medium, includes an embossed pit formed in advance along the track. The hologram recording and reproducing apparatus splits a light corresponding to the embossed pit as a servo light out of the reflected beam, and detects the servo light with a tetramerous optical detector for servo control. Thus, the hologram recording and reproducing apparatus controls the track and the focus with the embossed pit, so as to accurately irradiate the rotating disk with the reference beam, to thereby record and reproduce the hologram.

Patent Document 1: JP-A-H09-305978

In the conventional hologram recording and reproducing apparatus, however, the reference beam may be emitted onto the rotating disk at different angles (tilted), between the irradiation for recording and the irradiation for reproduction. When such a tilt is incurred, the hologram recording and reproducing apparatus cannot secure a sufficient amount of reflected beam for reproduction, and hence fails to obtain the reflected beam with the accurate pixel pattern and to properly reproduce the recorded information, thus resulting in a reproduction error.

SUMMARY OF THE INVENTION

The present invention has been conceived in view of the foregoing situation, with an object to provide a hologram recording and reproducing apparatus that performs servo control on the tilt of the reference beam with respect to the hologram recording medium, so as to minimize the reproduction error.

To achieve the foregoing object, the present invention provides the following technical solution.

The present invention provides a hologram recording and reproducing apparatus configured to function in the following manner. First, coherent light is emitted by a light source and this light is split into a recording beam and a reference beam. These beams are superposed on each other for recording a hologram on a hologram recording medium. Thereafter, when the recorded information is to be reproduced, the hologram recording medium is irradiated with the reference beam under servo control for correcting the irradiation status. The reflected beam from the hologram recording medium is detected with an optical detector for conversion of a reproduction signal. According to the present invention, the hologram recording and reproducing apparatus comprises an optical detector for servo control provided apart from the optical sensor for conversion of a reproduction signal; and a pixel pattern generator that generates a recording pixel pattern and a servo pixel pattern on a wave surface of the recording beam when recording the hologram on the hologram recording medium. The recording pixel pattern is discretely distributed and corresponding to information to be recorded, while the servo pixel pattern has a predetermined configuration and position for servo control. Further, the apparatus of the present invention comprises a reflected beam splitter and a servo controller. The beam splitter splits the reflected beam from the hologram recording medium into a reproduction beam and a servo beam. The reproduction beam is directed to the optical detector for reproduction signal conversion to reproduce the recording pixel pattern, while the servo beam is directed to the optical detector for servo control to reproduce the servo pixel pattern. The servo controller controls the tilting status of the reference beam with respect to the hologram recording medium, and this control is performed based on an output signal from the optical detector for servo control.

The apparatus of the present invention detects a servo beam corresponding to the servo pixel pattern formed in the recording process, and corrects, upon reproduction of the recorded information, the tilting status of the reference beam with respect to the hologram recording medium based on the servo beam. Such configuration permits detecting the reflected beam containing the correct recording pixel pattern with a sufficient light amount in the reproduction process, which is advantageous to eliminating a reproduction error originating from the tilt.

Preferably, the hologram recording medium may be a rotating disk to be rotated, and the servo pixel pattern may include at least one of a first segment and paired second segments, where the first segment is of a stripe pattern extending in a direction of the disk rotation in a central region of the wave surface, while the paired second segments are spaced from each other across the first segment so as to occupy a peripheral region of the wave surface. The recording pixel pattern may be formed in a remaining region on the wave surface where the servo pixel pattern is absent.

Preferably, the optical detector for servo control may include a pair of first split photodetectors for splitting the light corresponding to the first segment split into two portions and respectively receiving the split light. Further, the servo controller may detect the tilt of the reference beam with respect to the hologram recording medium about an axis along a radial direction of the disk, where this detection of the tilt is based on the difference in amount of the light received by the first split photodetectors.

Preferably, the servo controller may compare a total amount of the light received by the first split photodetectors with a predetermined reference value, so as to decide a reproduction error based on the comparison result.

Preferably, the optical detector for servo control may include a pair of second split photodetectors for splitting the light corresponding to the second segments into two portions and respectively receiving the split light. The servo controller may detect the tilt of the reference beam with respect to the hologram recording medium about an axis along a rotating direction of the disk, based on the difference in amount of the light received by the second split photodetectors.

In still another exemplary embodiment, the pixel pattern generator may generate a confirming pixel pattern on the wave surface of the recording beam for examining the recording status, in addition to the recording pixel pattern and the servo pixel pattern. The optical detector for servo control may include a third split photodetector for splitting and receiving a light corresponding to the confirming pixel pattern. The servo controller may decide a recording error based on a detection signal from the third split photodetector.

Preferably, the hologram recording medium may be a rotating disk including a reflection zone formed along the track, and the optical detector for servo control may include a fourth split photodetector for splitting the light reflected by the reflection zone into four portions and receiving the split light. The servo controller may execute a track control and a focus control based on a detection signal from the fourth split photodetector.

Preferably, the hologram recording and reproducing apparatus may further comprise a polarizer that polarizes the light corresponding to the recording pixel pattern and the light corresponding to the servo pixel pattern, in a mutually perpendicular direction.

Other features and advantages of the present invention will become more apparent through the detailed description given below referring to the accompanying drawings.

DETAILED DESCRIPTION OF THE PREFERRED EMBODIMENTS

The present invention will now be described in details, referring to the accompanying drawings. FIGS. 1 through 6 are related to an embodiment of a hologram recording and reproducing apparatus according to the present invention.

Figure 1:
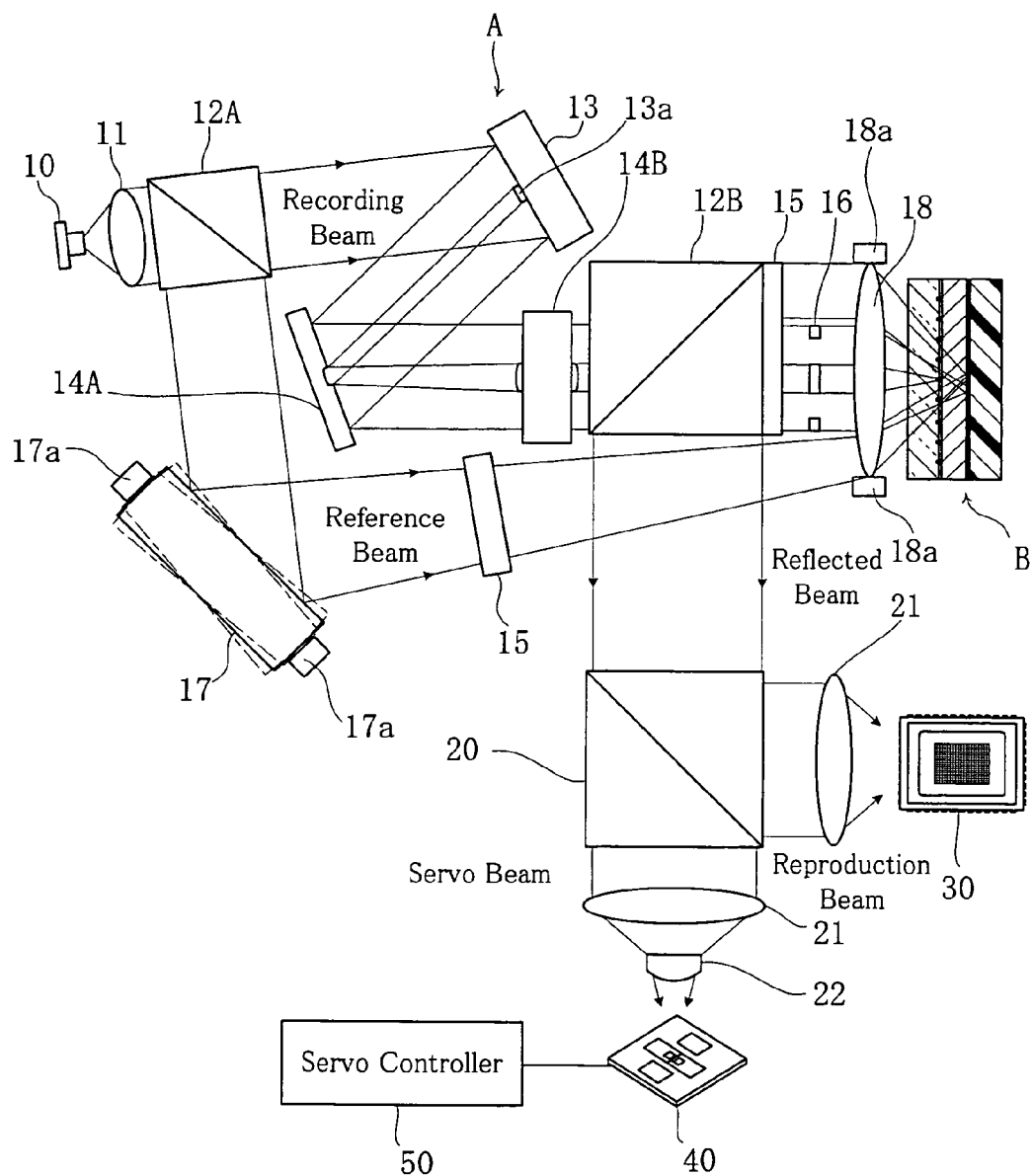
FIG. 1 is a schematic diagram showing an overall configuration of a hologram recording and reproducing apparatus according to an embodiment of the present invention.

As shown in FIG. 1, the hologram recording and reproducing apparatus A according to a first embodiment includes a light source 10, a collimator lens 11, a first and a second beam splitter 12A, 12B, a recording beam modulating multi-segment mirror (pixel pattern generator) 13, a first and a second splitting prism 14A, 14B, a λ/4 plate 15, a polarizing plate 16, a reference beam two-dimensional control mirror 17, an object lens 18, a beam splitter for splitting reflected beam (reflected beam splitter) 20, a condenser lens 21, a cylindrical lens 22, an optical detector 30 for reproduction signal conversion, an optical detector 40 for servo control, and a servo controller. Other constituents not shown include a rotating mechanism that rotates a disk serving as a hologram recording medium designated by B, a moving mechanism that moves an optical system including the object lens 18 in a radial direction of the hologram recording medium B. The rotating mechanism and the moving mechanism, as well as the reference beam two-dimensional control mirror 17 and the object lens 18 are controlled by the servo controller 50.

Figure 2:
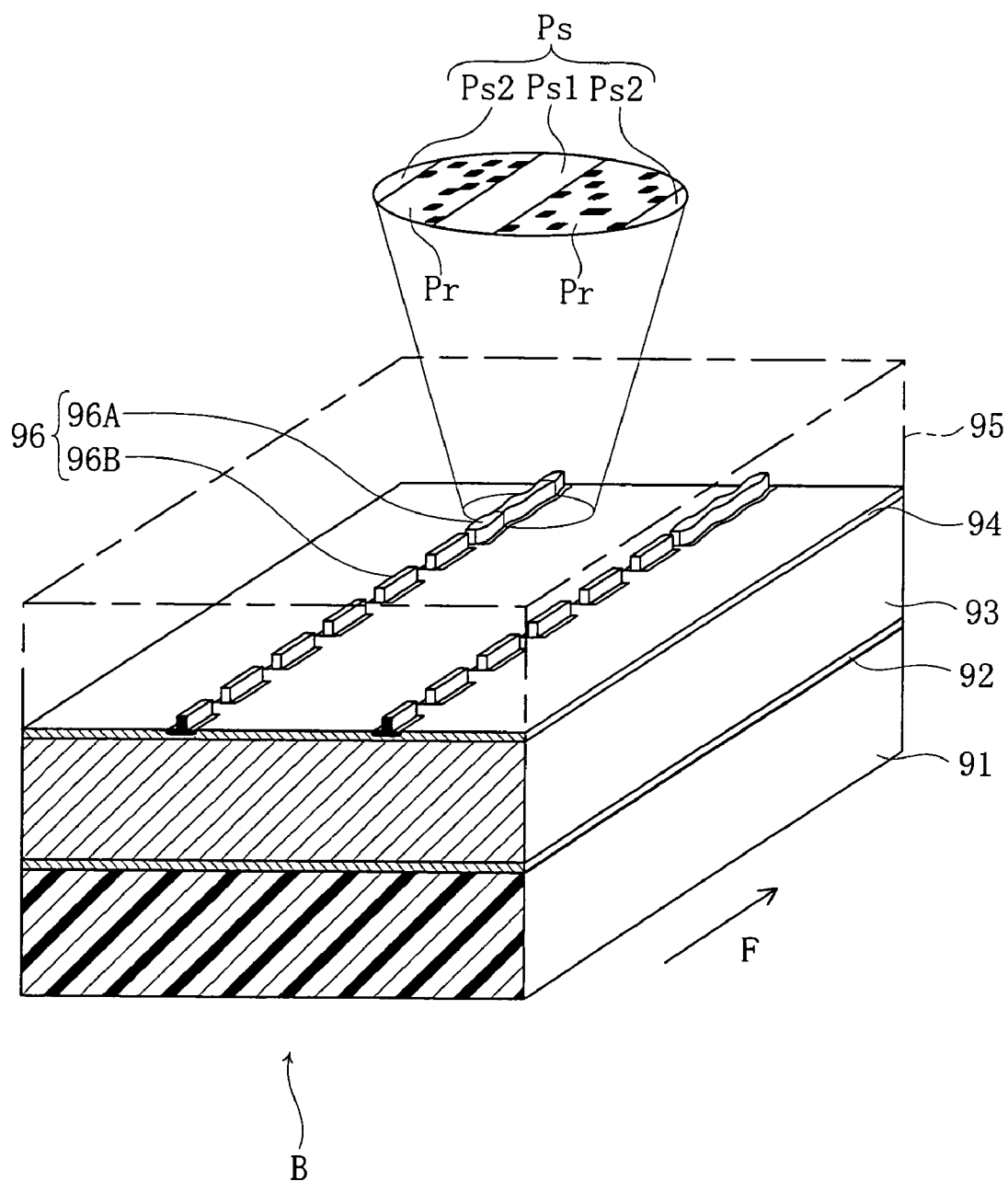
FIG. 2 is a fragmentary perspective view showing a recording status in the hologram recording and reproducing apparatus of FIG. 1.

As is apparent from FIG. 2, the hologram recording medium B includes a base substrate layer 91, a first dielectric layer 92, a hologram recording layer 93, a second dielectric layer 94, and a transparent substrate layer 95, stacked in this sequence. The hologram recording medium B includes a reflection zone 96 of an embossed pit shape, formed in advance along a track constituting a recording unit region in a circumferential direction, and such reflection zone 96 is the irradiation target of the recording beam and the reference beam. The reflection zone 96 includes an address region having a variation in width so as to generate an address signal when recording or reproducing, and a recording region 96B aligned at regular intervals so as to generate a clock signal (CLOCK), and a multitude of such reflection zones is continuously disposed along the respective tracks.

The light source 10 is constituted of for example a semiconductor laser device, which emits a laser beam in a form of a highly interferential coherent light of a relatively narrow frequency band, when recording or reproducing. The collimator lens 11 converts the laser beam emitted by the light source 10 into a parallel light. The laser beam output from the collimator lens 11 is led to the first beam splitter 12A, which splits the laser beam received into a recording beam directed to the recording beam modulating multi-segment mirror 13 and a reference beam directed to the reference beam two-dimensional control mirror 14 through a different optical path.

Figure 3:
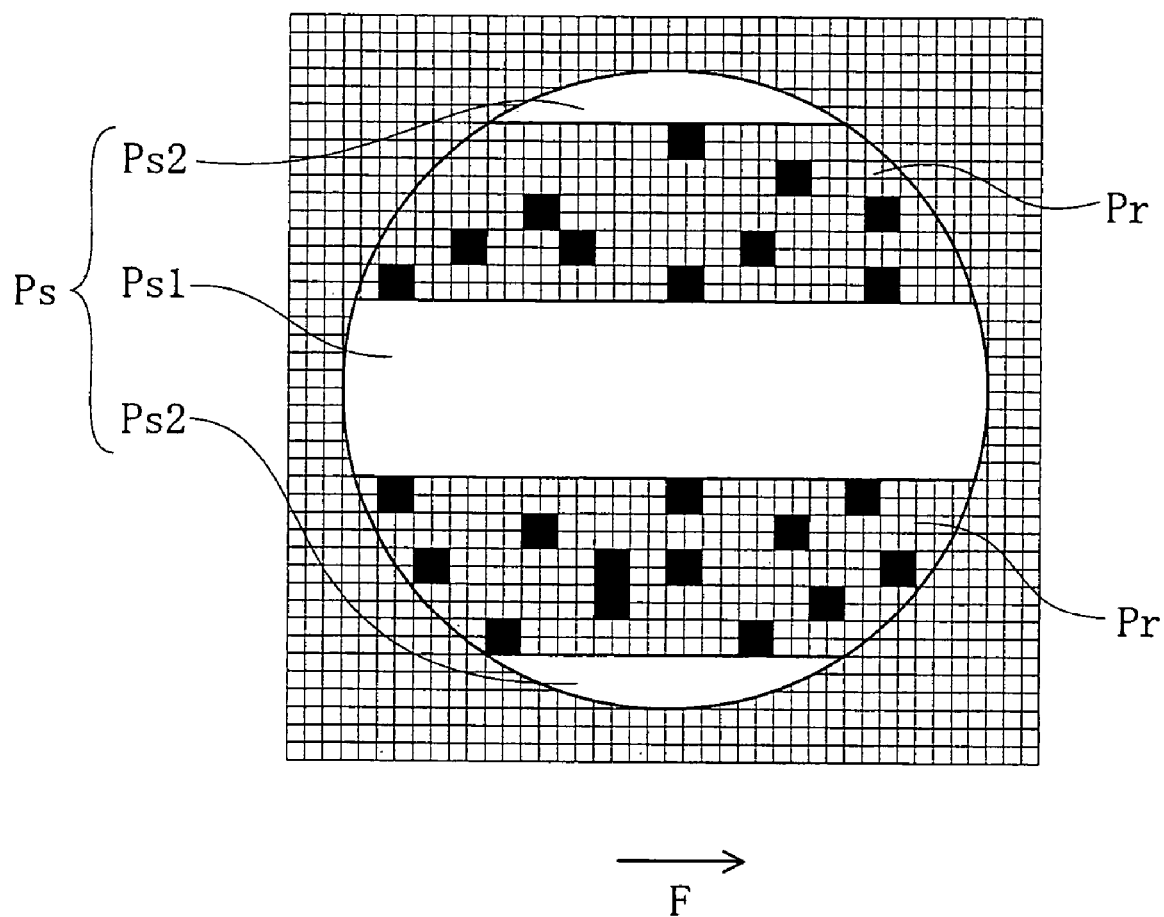
FIG. 3 is a schematic plan view showing a wave surface of a recording beam under the recording status shown in FIG. 2.

The recording beam modulating multi-segment mirror 13 is constituted of for example a deformable mirror device capable of modulating the beam for each pixel. The recording beam modulated by the recording beam modulating multi-segment mirror 13 has a wave surface as shown in FIGS. 2 and 3. More specifically, the recording beam modulating multi-segment mirror 13 forms a discretely distributed recording pixel pattern Pr on the wave surface of the recording beam according to the information to be recorded, as well as a servo pixel pattern (whitened-out sections in the circle in FIGS. 2 and 3) Ps on the same wave surface, for executing a servo control, where the servo pixel pattern has a predetermined configuration and a predetermined position. As is apparent from FIG. 3, the servo pixel pattern Ps includes a first segment Ps1 extending in a rotating direction F of the disk in a central region of the wave surface, and a pair of second segments Ps2 spaced from each other across the first segment Ps1 so as to occupy a peripheral region of the wave surface. The first segment Ps1 is formed by a splitting mirror 13a provided in a central portion of the recording beam modulating multi-segment mirror 13 when recording and reproducing, while the second segment Ps2 is formed by a peripheral portion of the recording beam modulating multi-segment mirror 13, which is not blocked by the splitting mirror 13a, only when recording. The recording pixel pattern Pr is formed on the wave surface of the recording beam, in a region within the servo pixel pattern Ps but except the first segment Ps1 and the second segment Ps (i.e. region between the first segment Ps1 and the second segment Ps2) Here, the light corresponding to the first segment Ps1 is incident upon the hologram recording medium B so as to slightly overstep the reflection zone 96.

The first and the second splitting prism 14A, 14B transmit a light out of the recording beam corresponding to the second segment Ps2 and the recording pixel pattern Pr recording beam as it is, but modulate a light corresponding to the first segment Ps1 so as to grant sufficient power, and lead these lights to the second beam splitter 12B. The second beam splitter 12B leads, while directing the recording beam toward the object lens 18, a light returning from the hologram recording medium B through the object lens 18 (reflected beam) to the reflected beam splitter 20. The $\lambda/4$ plate 15 grants the transmitted light with a phase difference $\pi/2$. The polarizing plate 16 is constituted of for example a $\lambda/2$ plate that grants the transmitted light with a phase difference $\pi$, and is disposed on the path of the light corresponding to the first segment Ps1 and the second segment Ps2. Under such configuration, the light corresponding to the recording pixel pattern Pr and the light corresponding to the servo pixel pattern Ps are emitted onto the hologram recording medium B, mutually perpendicularly polarized by the polarizing plate 16. Accordingly, the light corresponding to the recording pixel pattern Pr and the light corresponding to the servo pixel pattern Ps barely interfere with each other, on the hologram recording medium B.

The reference beam two-dimensional control mirror 17 reflects the laser beam incident thereon to constitute the reference beam, so that the reference beam proceeds to the $\lambda/4$ plate 15 and the object lens 18. With such function, the reference beam two-dimensional control mirror 17 quickly changes the irradiation angle of the reference beam to the hologram recording medium B, with an action of a servo coil 17a for tilt control based on a signal from the servo controller 50. The object lens 18 converges the recording beam and the reference beam so as to irradiate the hologram recording medium B with these beams superposed on each other. The object lens 18 quickly adjusts the irradiation position of the reference beam and the recording beam with respect to the hologram recording medium B, with an action of a servo coil 18a for track control and focus control based on a signal from the servo controller 50. With such function, the object lens 18 transmits the reflected beam from the hologram recording medium B toward the second beam splitter 12B.

The reflected beam splitter 20 receives the reflected beam from the hologram recording medium B, and splits the reflected beam into a reproduction beam directed to the optical detector for reproduction signal conversion 30 so as to reproduce the recording pixel pattern Pr, and a servo beam directed to the optical detector for servo control 40 so as to reproduce the servo pixel pattern Ps. The reproduction beam is received by the optical detector for reproduction signal conversion 30 through the condenser lens 21. The servo beam is received by the optical detector for servo control 40 through the condenser lens 21 and the cylindrical lens 22. The optical detector for reproduction signal conversion 30 may be constituted of a CCD sensor or a CMOS sensor. The optical detector for servo control 40 may be constituted of a PIN photodiode, which is more responsive than the CCD sensor or the CMOS sensor. The servo controller 50 includes a hardware circuit, so as to perform the servo control based on a signal from the optical detector for servo control 40.

Figure 4:
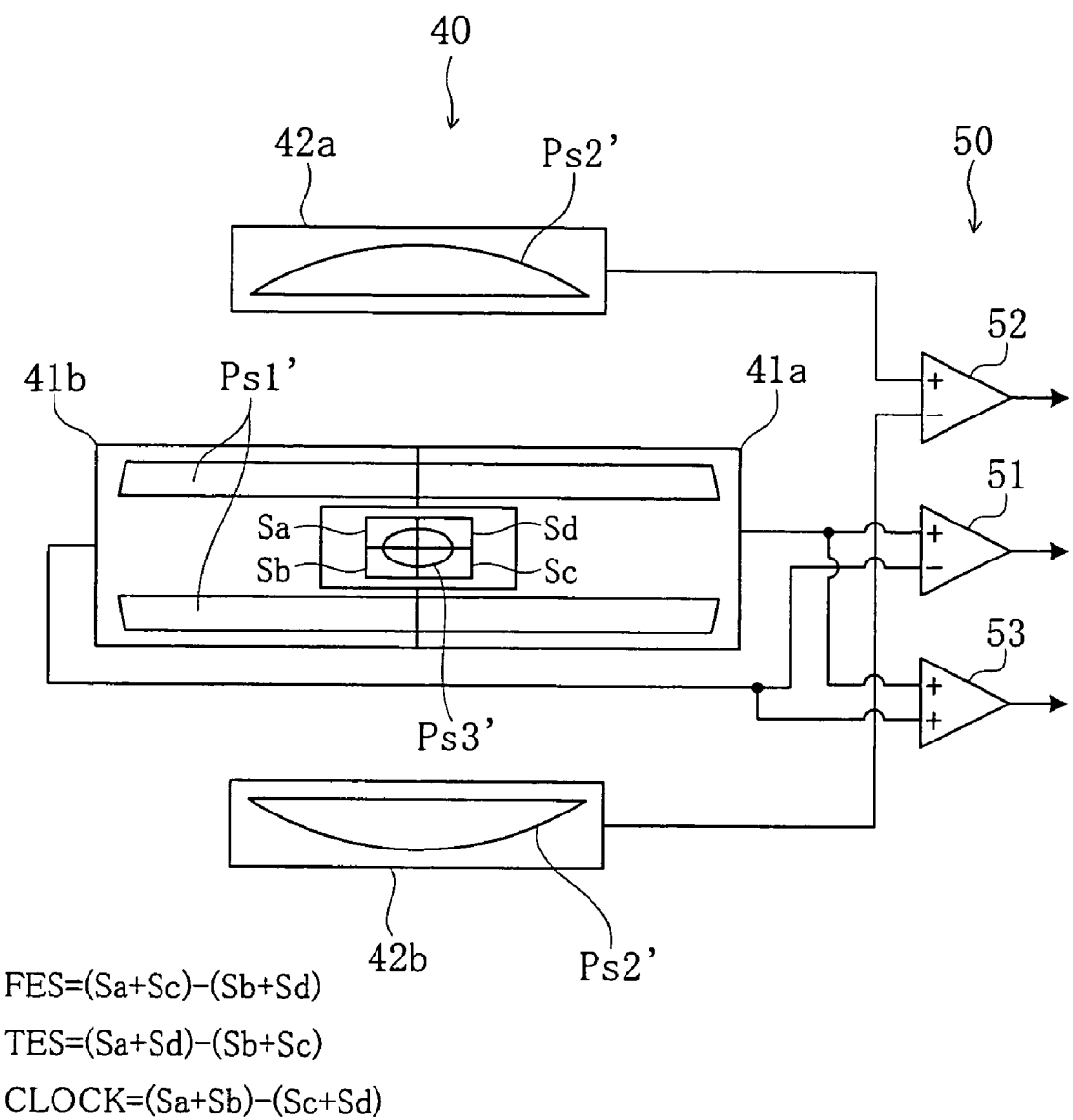
FIG. 4 is a schematic diagram showing the optical detector for servo control and the servo controller shown in FIG. 1.

More specifically, as shown in FIG. 4, the optical detector for servo control 40 includes a pair of first split photodetectors 41a, 41b that split the returning light Ps1' corresponding to the first segment Ps1 into a forward and a rear portion in a rotation direction F of the disk and receive the split light, a pair of second split photodetectors 42a, 42b that split the returning light Ps2' corresponding to the second segment Ps2 into an outer and an inner portion in a radial direction of the disk and receive the split light, and a fourth split photodetectors Sa to Sd that split the light reflected by the reflection zone 96 (reflected light) Ps3' into four portions in the rotation direction F and the radial direction of the disk, and receive the split light. A signal from the first split photodetectors 41a, 41b representing the amount of received light (detection signal) is input to a differential amplifier 51 of the servo controller 50, and the differential amplifier 51 outputs a signal indicating a difference in the amount of received light between the first split photodetectors 41a and 41b. When the amounts of light received by the first split photodetectors 41a and 41b are different, the irradiation status of the reference beam with respect to the hologram recording medium B changes, such that the irradiation angle of the reference beam about an axis along a radial direction of the disk is biased from that at the time of recording (hereinafter, "tangential tilt"). To correct such tangential tilt, the servo controller 50 controls the servo coil for tilt control 17a such that the reference beam for reproduction is emitted at the same irradiation angle as that at the time of recording, based on the signal output by the differential amplifier 51.

A signal from the second split photodetectors 42a, 42b representing the amount of received light is input to a differential amplifier 52 of the servo controller 50, and the differential amplifier 52 outputs a signal indicating a difference in the amount of received light between the second split photodetectors 42a and 42b. When the amounts of light received by the second split photodetectors 42a and 42b are different, the irradiation status of the reference beam with respect to the hologram recording medium B changes, such that the irradiation angle of the reference beam about an axis along a rotating direction F of the disk is biased from that at the time of recording (hereinafter, "radial tilt"). To correct such radial tilt, the servo controller 50 controls the servo coil for tilt control 17a such that the reference beam for reproduction is emitted at the same irradiation angle as that at the time of recording, based on the signal output by the differential amplifier 52.

Likewise, a signal from the first split photodetectors 41a, 41b representing the amount of received light is input to a differential amplifier 53 of the servo controller 50, and the differential amplifier 53 outputs a signal indicating a total of the amount of light received by the first split photodetectors 41a and 41b. The total amount of light received by the first split photodetectors 41a and 41b is compared with a predetermined reference value, by the servo controller 50. When the total amount of the received light is below the predetermined reference value, the servo controller 50 decides that the reflected beam does not have a sufficient light amount, thus deciding that a reproduction error has arisen.

A circuit that processes a signal from the fourth split photodetectors Sa to Sd representing the amount of received light is configured as indicated by logical formulas shown in FIG. 4. Specifically, with respect to the amount of light received by the two fourth split photodetectors Sa, Sc diagonally located and the amount of light received by the other two fourth split photodetectors Sb, Sd, a difference therebetween is obtained as a focus error signal (FES). Based on such focus error signal (FES), the servo controller 50 controls the servo coil for focus control 18a. Likewise, a difference in the amount of received light between the two fourth split photodetectors Sa, Sd located on the same side in a radial direction of the disk, and between the other two fourth split photodetectors Sb, Sc, is obtained as a track error signal (TES). Based on such track error signal (TES), the servo controller 50 controls the servo coil for focus control 18a. Further, a difference in the amount of received light between the two fourth split photodetectors Sa, Sb located on the same side in a rotating direction F of the disk, and between the other two fourth split photodetectors Sc, Sd, is obtained as a clock signal (CLOCK). The clock signal (CLOCK) serves as a reference for setting an action timing for recording and reproducing.

The following passages cover an operation of the hologram recording and reproducing apparatus A.

When recording a hologram on the hologram recording medium B, the recording beam carrying on its wave surface the recording pixel pattern Pr and the servo pixel pattern Ps is emitted onto the reflection zone 96 set as the irradiation target, as shown in FIG. 2. Such positioning of the recording beam is controlled at real time based on the focus signal (FES), the track signal (TES), and an address signal. When the recording beam is thus emitted, the reference beam (not shown in FIG. 2) is emitted at a predetermined timing based on the clock signal (CLOCK), so as to be superposed on the recording beam at a predetermined angle. As a result, the hologram representing the recording pixel pattern Pr and the servo pixel pattern Ps is recorded on the hologram recording layer 93 of the hologram recording medium B. It is to be noted, however, a portion of the light corresponding to the first segment Ps1 of the servo pixel pattern Ps is reflected by the reflection zone 96, and hence the hologram is not recorded on the region corresponding to the reflection zone 96 in the hologram recording layer 93. Also, since the light corresponding to the recording pixel pattern Pr and the light corresponding to the servo pixel pattern Ps are mutually perpendicularly polarized by the polarizing plate 16 and hence kept from interfering with each other, the hologram corresponding to the recording pixel pattern Pr and the hologram corresponding to the servo pixel pattern Ps are clearly distinguished. Consequently, the information to be recorded can be securely recorded, represented by the hologram corresponding to the recording pixel pattern Pr.

When reproducing the recorded information out of the hologram recording medium B on which the hologram has been thus recorded, the reference beam is emitted while emitting a light from the splitting mirror 13a to the reflection zone 96 set as the irradiation target. The light from the splitting mirror 13a, which is emitted as part of the recording beam for the focus control the track control at the time of recording, is utilized for the focus control the track control also at the time of reproduction. More specifically, providing the reflected light Ps3' from the reflection zone 96 to the fourth split photodetectors Sa to Sd leads to generation of the focus signal (FES), the track signal (TES), and also the address signal. Based on these signals, the light from the splitting mirror 13a is accurately positioned on the reflection zone 96, and therefore the reference beam is also accurately positioned with respect to the reflection zone 96 when emitted.

Figure 5:
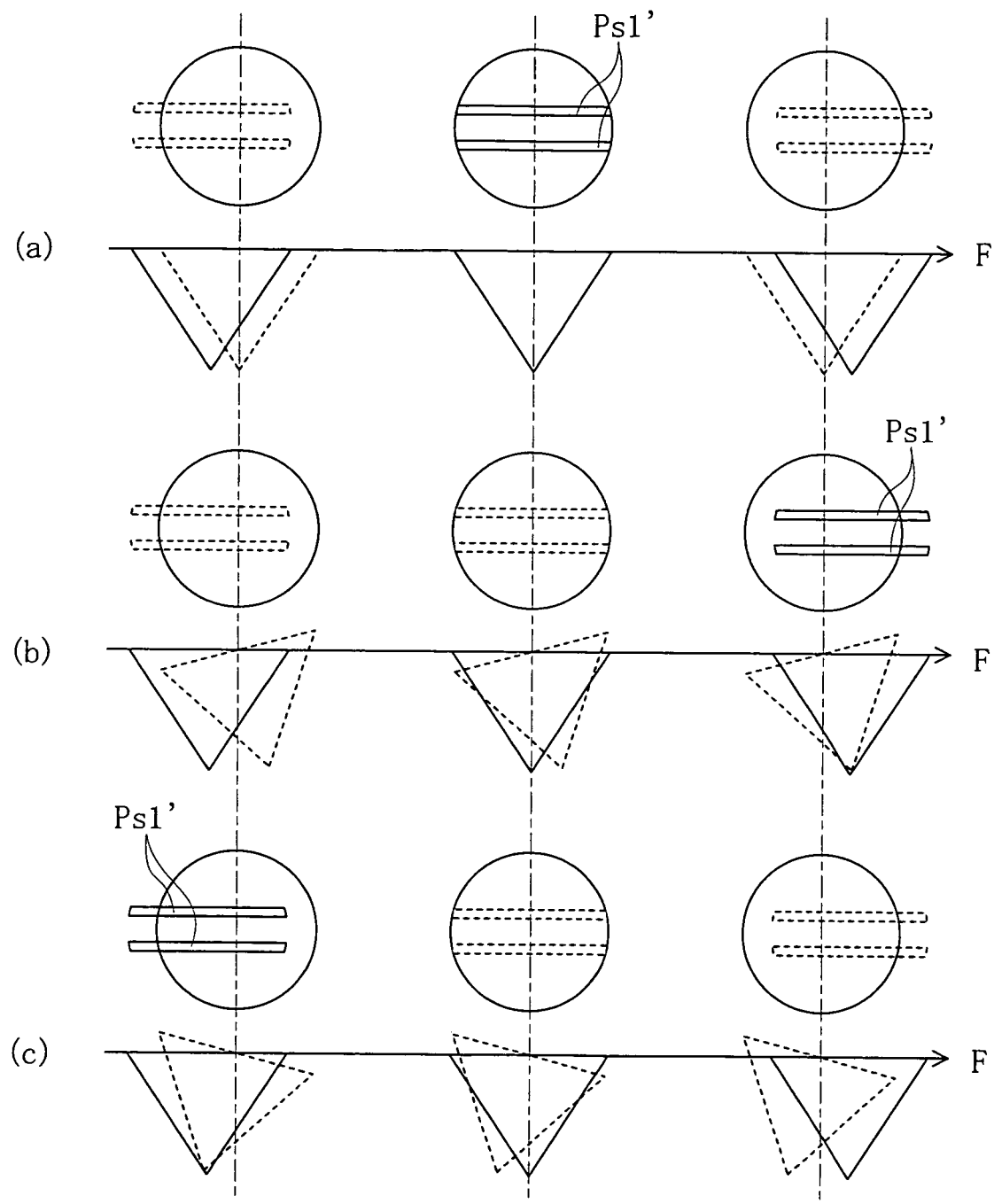
FIG. 5 is a schematic diagram for explaining an operation of the hologram recording and reproducing apparatus of FIG. 1.
Figure 6:
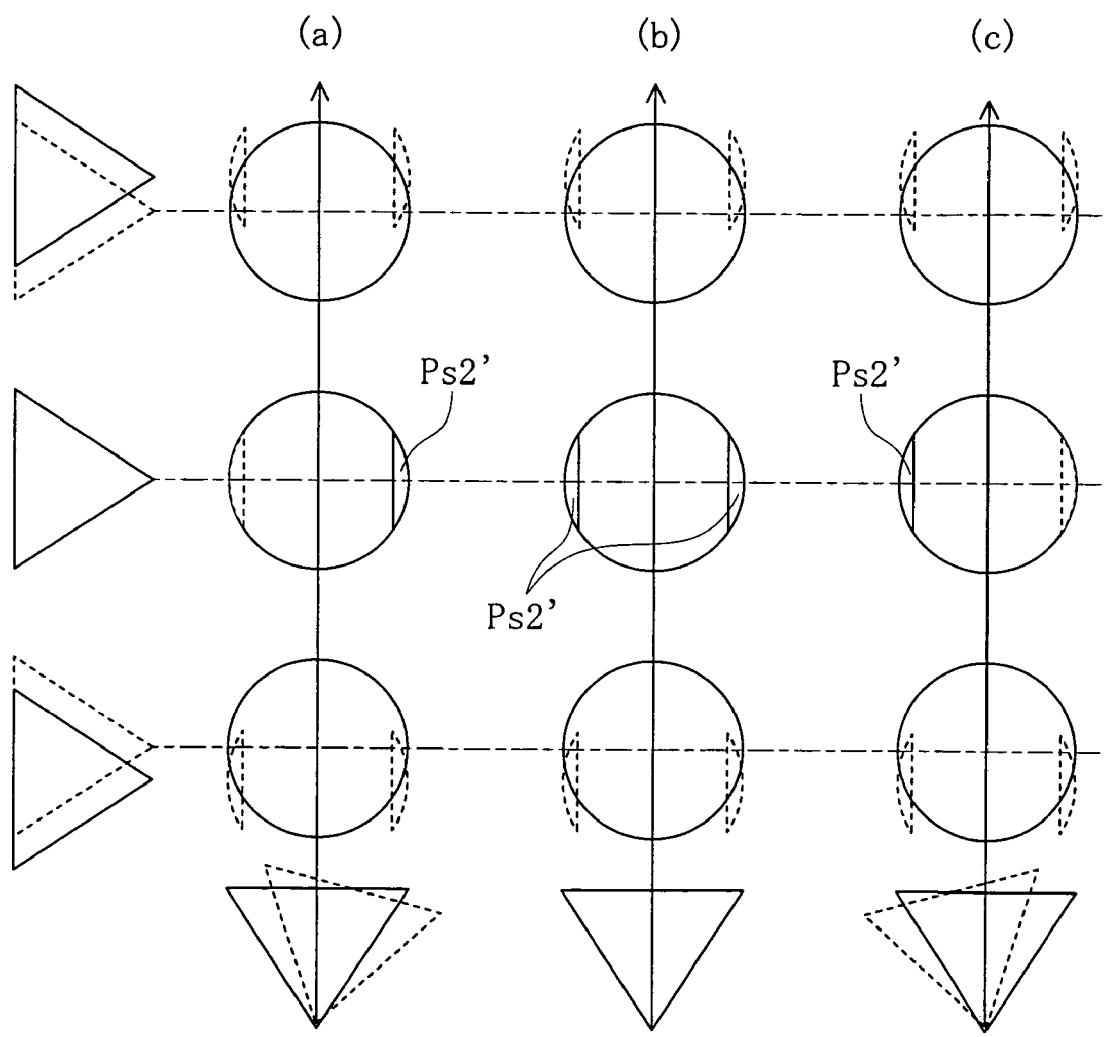
FIG. 6 is a schematic diagram for explaining an operation of the hologram recording and reproducing apparatus of FIG. 1.

At this stage, the reference beam may be emitted in three patterns with a tangential tilt as shown in FIG. 5, as well as in three patterns with a radial tilt as shown in FIG. 6. Here, the axis of the arrow in the respective drawings represents both the disk rotation direction F and the progress of time. The triangles drawn in solid lines schematically represent the status of the recorded hologram, while the triangles drawn in broken lines schematically represent the irradiation status of the reference beam.

Referring to FIG. 5, correction of the tangential tilt will be described. In the pattern of FIG. 5(*a*), the reference beam is superposed on the recorded hologram, at the same irradiation angle as that at the time of recording. When the reference beam is exactly superposed on the hologram (state shown in the center), the light Ps1' corresponding to the first segment Ps1 is most intensely reproduced, so that the light Ps1' is detected by the first split photodetectors 41a, 41b. In other words, when the total of the amount of light received by the pair of first split photodetectors 41a, 41b becomes equal to or greater than the reference value, a difference in the amount of received light received is detected. The difference at this stage is below the predetermined value, and actually close to zero. Accordingly, the servo controller 50 decides that the reference beam is emitted without the tangential tilt. Therefore, with respect to the pattern shown in FIG. 5(*a*), the reference beam is emitted at the same irradiation angle as that at the time of recording, without being subjected to correction in the tangential tilt.

On the other hand, in the patterns shown in FIGS. 5(*b*) and 5(*c*), the reference beam is emitted to the recorded hologram at an irradiation angle different from that at the time of recording. Under such state, the total amount of light received by the first split photodetectors 41a, 41b is equal to or greater than the reference value (state shown at the right of FIG. 5(*b*) and at the left of FIG. 5(*c*)), and hence the difference in the amount of received light is detected as a positive value (biased to the first split photodetector 41a as FIG. 5(*b*)), or a negative value (biased to the first split photodetector 41b as FIG. 5(*c*)) greater than the predetermined value. Accordingly, the servo controller 50 detects the direction and the amount of the tangential tilt at real time based on the plus and minus sign and the absolute value of the difference in the amount of received light, and executes the correction thereof. Consequently, with respect to the patterns shown in FIGS. 5(*b*) and 5(*c*) also, the reference beam is subjected to the correction in the tangential tilt, so as to be emitted at a substantially same irradiation angle as that at the time of recording.

Referring to FIG. 6, correction of the radial tilt will be described. Here, it is to be assumed that the tangential tilt has not been incurred in any of the patterns shown in FIG. 6(*a*)-(*c*). Accordingly, in the case of the radial tilt also, when the total amount of light received by the two first split photodetectors 41a, 41b is equal to or greater than the reference value (state shown in the center in each of the patterns (a) to (c)), the difference in the amount of light received by the second split photodetectors 42a, 42b is detected.

In the pattern of FIG. 6(*b*), the reference beam is superposed on the recorded hologram at the same irradiation angle as that at the time of recording. When the reference beam is exactly superposed on the hologram (state shown in the center), the light Ps2' corresponding to the second segment Ps2 is most intensely reproduced, so that the light Ps2' is detected by the second split photodetectors 42a, 42b. In other words, a difference in the amount of light received by the second split photodetectors 42a, 42b is detected. The difference at this stage is below the predetermined value, and actually close to zero. Accordingly, the servo controller 50 decides that the reference beam is emitted without the tangential tilt. Therefore, with respect to the pattern shown in FIG. 6(*b*), the reference beam is emitted at the same irradiation angle as that at the time of recording, without being subjected to correction in the radial tilt.

On the other hand, in the patterns shown in FIGS. 6(*a*) and 6(*c*), the reference beam is emitted to the recorded hologram at an irradiation angle different from that at the time of recording. Under such state, a portion of the hologram does not overlap the reference beam (left periphery in FIG. 6(*a*), and right periphery in FIG. 6(*c*)), even when the total amount of light received by the first split photodetectors 41a, 41b is equal to or greater than the reference value, and hence the light Ps2' corresponding to the second segment Ps2 is partially cut away. Accordingly, the difference in the amount of the light received by the second split photodetector 42a, 42b is detected as a negative value (biased to the second split photodetector 42b as FIG. 6(a)), or a positive value (biased to the second split photodetector 42a as FIG. 6(c)) greater than the predetermined value. Therefore, the servo controller 50 detects the direction and the amount of the tangential tilt at real time based on the plus and minus sign and the absolute value of the difference in the amount of received light, and executes the correction thereof. Consequently, with respect to the patterns shown in FIGS. 6(a) and 6(c) also, the reference beam is subjected to the correction in the radial tilt, so as to be emitted at a substantially same irradiation angle as that at the time of recording.

To summarize, even though the reference beam incurs the tangential tilt or the radial tilt in the reproduction, the tilt is corrected at real time based on the light Ps1', Ps2' respectively corresponding to the first segment Ps1 and the second segment Ps2. Therefore, the reproduction beam corresponding to the recording pixel pattern Pr generated at the time of recording is detected out of the reflected light by the optical detector for reproduction signal conversion 30, which leads to correctly reading out the recorded information.

Thus, the foregoing hologram recording and reproducing apparatus A corrects the tangential tilt and the radial tilt of the reference beam at real time at the time of reproduction, thereby assuring correct detection of the reproduction beam that contains the same pattern as the recording pixel pattern Pr generated at the time of recording, by the optical detector for reproduction signal conversion 30. Consequently, the hologram recording and reproducing apparatus A permits accurately reproducing the recorded information based on the hologram, without incurring a reproduction error arising from the tangential tilt or the radial tilt.

Figure 7:
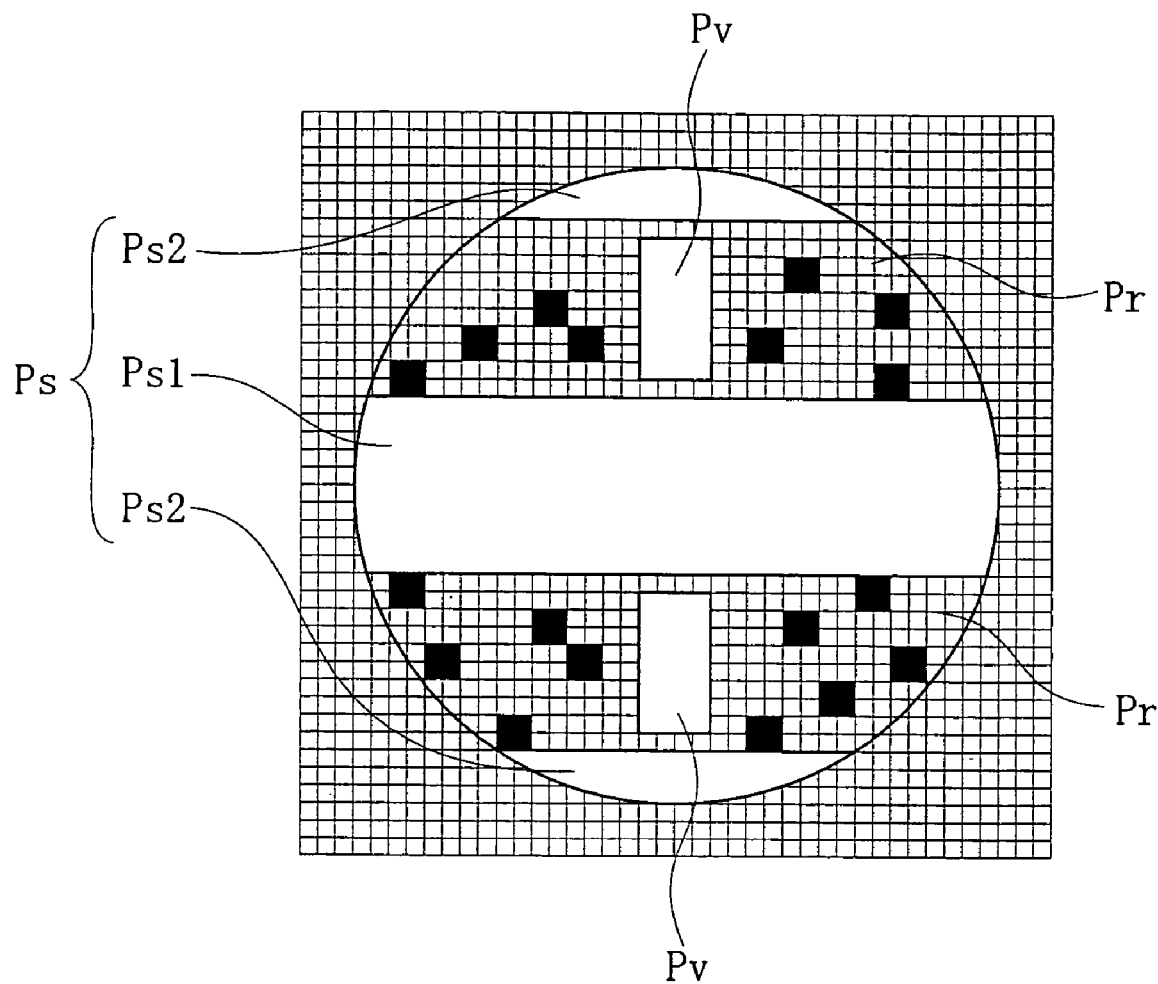
FIG. 7 is a schematic plan view showing a wave surface of a recording beam under a recording status in another embodiment of the present invention.
Figure 8:
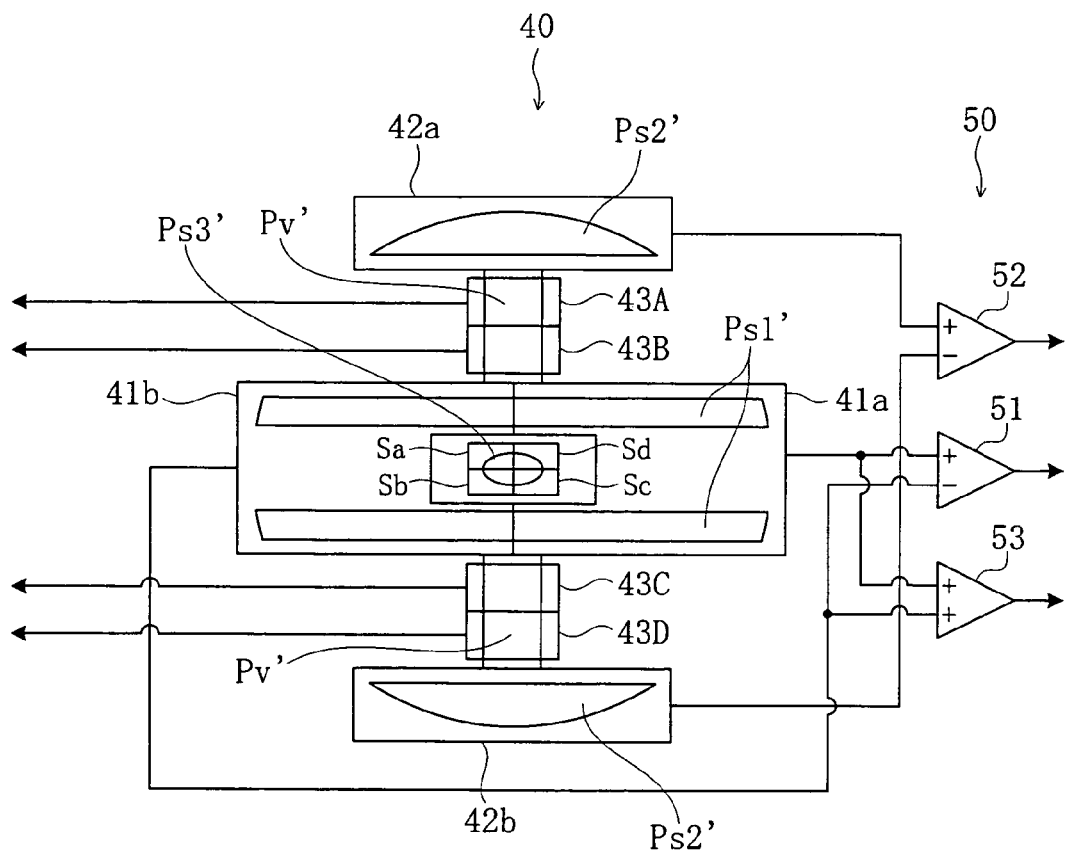
FIG. 8 is a schematic diagram showing an optical detector for servo control and a servo controller according to the latter embodiment.

FIGS. 7 and 8 depict a hologram recording and reproducing apparatus according to another embodiment of the present invention. In these drawings, same or similar constituents to those of the foregoing embodiment are given the identical numeral, and description thereof will be omitted.

In this embodiment, as shown in FIG. 7, a simplified confirming pixel pattern Pv for examining the recording status is formed on the wave surface of the recording beam modulated by the recording beam modulating multi-segment mirror 13, in addition to the recording pixel pattern Pr and the servo pixel pattern Ps. The simplified confirming pixel pattern Pv is formed in a region between the first segment Ps1 and the second segment Ps2 in the servo pixel pattern Ps, i.e. in a region constituted of a predetermined number of pixels corresponding to a central portion of the recording pixel pattern Pr. The simplified confirming pixel pattern Pv is generated at the time of recording by the recording beam modulating multi-segment mirror 13 together with the recording pixel pattern Pr, so that a hologram corresponding to the simplified confirming pixel pattern Pv included in the hologram corresponding to the recording pixel pattern Pr, in the hologram recording layer 93 of the hologram recording medium B. In the simplified confirming pixel pattern Pv, the confirming information of for example 1 bit is allocated to a segment containing at least four pixels, so as to form different segment patterns according to the information to be recorded.

Also, the optical detector for servo control 40 includes a third split photodetectors 43A to 43D that split a returning light Pv' corresponding to the simplified confirming pixel pattern Pv into four portions, and receive the split light. Each detection signal from the third split photodetectors 43A to 43D is decided by the servo controller 50 whether matching with the signal corresponding to the confirming information, and the servo controller 50 decides that a recording error has arisen when at least one detection signal is different from the signal corresponding to the confirming information. When the recording error has arisen, the servo controller 50 controls the operation for example so as to record the hologram again in a different area.

More specifically, when recording the hologram in the hologram recording medium B, the servo controller 50 executes the control so as to record the hologram corresponding to the recording pixel pattern Pr and the servo pixel pattern Ps, through a similar procedure to that of the foregoing embodiment, as well as so as to record the hologram corresponding to the simplified confirming pixel pattern Pv.

Upon recording the hologram, the servo controller 50 immediately executes the control so as to irradiate the hologram recording medium B with the reference beam. At this stage, the light Pv' corresponding to the simplified confirming pixel pattern Pv is received by the third split photodetectors 43A to 43D of the optical detector for servo control 40. Concurrently, the light Ps1' corresponding to the first segment Ps1 is received by the first split photodetectors 41a, 41b. The respective detection signals from the third split photodetectors 43A to 43D are binarized based on the total amount of light received by the first split photodetectors 41a, 41b. When the signal thus binarized is detected as being different from the confirming information, the servo controller 50 instantaneously decides that a recording error has arisen.

When the recording error has arisen, the servo controller 50 looks for a substitute area that can serve as another recording area based on the address signal, and executes the control so as to record the hologram again in the substitute area.

Consequently, the hologram recording and reproducing apparatus according to this embodiment is capable of quickly performing the confirming operation at the time of recording, in addition to the correction of the radial tilt and the tangential tilt for reproduction, and thus suppressing emergence of the recording error.

It is to be understood that the present invention is not limited to the foregoing embodiments. The hologram recording and reproducing apparatus may be configured to detect only either of the radial tilt or the tangential tilt. The hologram recording medium may be a rectangular plate that can be translated, instead of a rotating disk.

The invention claimed is:

1. A hologram recording and reproducing apparatus in which coherent light emitted by a light source is split into a recording beam and a reference beam, both beams being superposed on each other for recording a hologram on a hologram recording medium, the hologram recording medium being irradiated with the reference beam for reproducing recorded information, the irradiation being corrected under a servo control, while a reflected beam from the hologram recording medium is detected with an optical detector for conversion of a reproduction signal, the apparatus comprising:

an optical detector for servo control provided apart from the optical sensor for conversion of a reproduction signal;

a pixel pattern generator that generates a recording pixel pattern and a servo pixel pattern on a wave surface of the recording beam when recording the hologram on the hologram recording medium, the recording pixel pattern being discretely distributed and corresponding to information to be recorded, the servo pixel pattern having a predetermined configuration and position for servo control;

a reflected beam splitter that splits the reflected beam from the hologram recording medium into a reproduction beam and a servo beam, the reproduction beam directed to the optical detector for reproduction signal conversion to reproduce the recording pixel pattern, the servo beam being directed to the optical detector for servo control to reproduce the servo pixel pattern; and a servo controller that controls a tilting status of the reference beam with respect to the hologram recording medium, the control being based on an output signal from the optical detector for servo control.

2. The hologram recording and reproducing apparatus according to claim 1, wherein the hologram recording medium is a rotating disk to be rotated, and wherein the servo pixel pattern includes at least one of a first segment and paired second segments, the first segment being of a stripe pattern extending in a direction of the disk rotation in a central region of the wave surface, the second segments being spaced from each other across the first segment to occupy a peripheral region of the wave surface, the recording pixel pattern being formed in a remaining region on the wave surface where the servo pixel pattern is absent.

3. The hologram recording and reproducing apparatus according to claim 2, wherein the optical detector for servo control includes a pair of first split photodetectors for splitting the light corresponding to the first segment into two portions and respectively receiving the two portions, and wherein the servo controller detects the tilt of the reference beam with respect to the hologram recording medium about an axis along a radial direction of the disk, the detection of the tilt being based on a difference in light received by the respective first split photodetectors.

4. The hologram recording and reproducing apparatus according to claim 3, wherein the servo controller compares a total amount of the light received by the first split photodetectors with a predetermined reference value, to decide a reproduction error based on the comparison result.

5. The hologram recording and reproducing apparatus according to claim 2, wherein the optical detector for servo control includes a pair of second split photodetectors for splitting light corresponding to the paired second segments into two portions and respectively receiving the two portions, and wherein the servo controller detects the tilt of the reference beam with respect to the hologram recording medium about an axis along a rotating direction of the disk, the detection of the tilt being based on a difference in light received by the second split photodetectors.

6. The hologram recording and reproducing apparatus according to claim 1, wherein the pixel pattern generator generates a confirming pixel pattern on the wave surface of the recording beam for examining a recording status, in addition to the recording pixel pattern and the servo pixel pattern, wherein the optical detector for servo control includes a third split photodetector for splitting and receiving light corresponding to the confirming pixel pattern, and wherein the servo controller decides a recording error based on a detection signal from the third split photodetector.

7. The hologram recording and reproducing apparatus according to claim 1, wherein the hologram recording medium is a rotating disk including a reflection zone formed along the track, wherein the optical detector for servo control includes a fourth split photodetector for splitting light reflected by the reflection zone into four portions and receiving the four portions, and wherein the servo controller executes a track control and a focus control based on a detection signal from the fourth split photodetector.

8. The hologram recording and reproducing apparatus according to claim 1, further comprising a polarizer that polarizes light corresponding to the recording pixel pattern and light corresponding to the servo pixel pattern in a mutually perpendicular direction.

* * * * *